United States Patent
Dummermuth

[11] Patent Number: 5,305,842
[45] Date of Patent: Apr. 26, 1994

[54] FEED DEVICE ON A SURFACE-CLEANING MACHINE

[75] Inventor: Paul Dummermuth, Zunzgen, Switzerland

[73] Assignee: Pamag AG, Flums, Switzerland

[21] Appl. No.: 989,598

[22] Filed: Dec. 15, 1992

[30] Foreign Application Priority Data

Dec. 16, 1991 [CH] Switzerland .................. 03710/91

[51] Int. Cl.⁵ ............................................. B62D 51/04
[52] U.S. Cl. .................................. 180/11; 180/19.1; 180/19.3
[58] Field of Search ................. 180/11, 12, 13, 19.1, 180/19.2, 19.3; 15/49.1, 50.1, 50.3, 51, 52, 52.1, 98, 389, 340.2, 340.3

[56] References Cited

U.S. PATENT DOCUMENTS 1,819,791  8/1931  Reed ..................... 180/19.1

FOREIGN PATENT DOCUMENTS 666173  7/1988  Switzerland .

Primary Examiner—Mitchell J. Hill
Attorney, Agent, or Firm—Weingarten, Schurgin, Gagnebin & Hayes

[57] ABSTRACT

A motor-driven propulsion device (10) can be attached separately to a surface-cleaning machine (1), which has a drive (2) for a rotor drum and is equipped with a handle supporting deck (3) for manual propulsion. For this, the device (10) is connected mechanically to the handle supporting deck (3) and secured to the axle (5) of the surface-cleaning machine (1) with a swivel hook (34) and a two-pronged fork. In this position, at least one motor-driven frictional wheel (11) presses on the running wheels (6) of the surface-cleaning machine (1). The frictional wheel (11) is driven by a separate motor in the housing (12) of the propulsion device (10), which, if necessary, uses a separate power supply or the same power supply as the drive motor of the rotor drum of the surface-cleaning machine (1).

12 Claims, 2 Drawing Sheets

FEED DEVICE ON A SURFACE-CLEANING MACHINE

BACKGROUND OF THE INVENTION

This invention concerns a propulsion device, otherwise known as a feed device, on a motor-driven surface-cleaning machine, which is equipped for manual translation with a handle supporting deck firmly attached to the surface-cleaning machine and has an axle with two wheels placed in the area where the handle supporting deck connects, wherein the feed device can be coupled to the surface-cleaning machine.

SUMMARY OF THE INVENTION

The applicant produces surface-cleaning machines that have a motor-driven rotor drum and a height adjustment to change the processing power. The rotor drum is equipped with a number of strike plates. Surface-cleaning machines like the one specified are produced in various sizes. Most large, heavy surface-cleaning machines are equipped with internal combustion engines that drive not only the rotor drum, but also move the machine. In contrast to them, most lighter, smaller surface-cleaning machines are driven by electric or pneumatic motors, in which only the rotor drum is driven by the motor. The moving is done by an operator who moves the machine over the surface to be processed. For this, the surface-cleaning machine has a handle supporting deck, an axle with two wheels near where the handle supporting deck connects to it and a front roller.

When the surface is processed, a reactive force acts on the surface-cleaning machine so that the machine tends to run away as a result of the direction of rotation of the milling. The operator must therefore counteract this reactive force either by braking the machine or by moving against the reactive force. Here, the speed at which the surface-cleaning machine moves forward should be kept as constant as possible, so that an even cleaning effect is achieved. This takes experience and matching endurance for large surfaces.

There is therefore a need to provide existing machines, as well as the smaller new machines, with a propulsion device, otherwise known as a feed device, that can be attached to them. A corresponding detachable feed device for surface-cleaning machines is known from CH-A-666'173. This known feed device can be attached to the axle near where the handle supporting deck connects and consists of a bicycle-like frame with two running wheels and a pedal drive. This solution has proven suitable for cleaning large surfaces, especially outdoors. But it is too bulky and not maneuverable enough for cleaning smaller surfaces, especially floors in closed rooms.

The task of the invention is consequently to create a feed device for a surface-cleaning machine which is as simple as possible to assemble and disassemble and can be mounted onto the surface-cleaning machine in the most space-saving way possible. This task is solved by a device as described and claimed herein.

BRIEF DESCRIPTION OF THE DRAWINGS

The drawings show a preferred example of an embodiment of the object of the invention; it is explained in the description below.

DESCRIPTION OF THE PREFERRED EMBODIMENT

Figure 1:
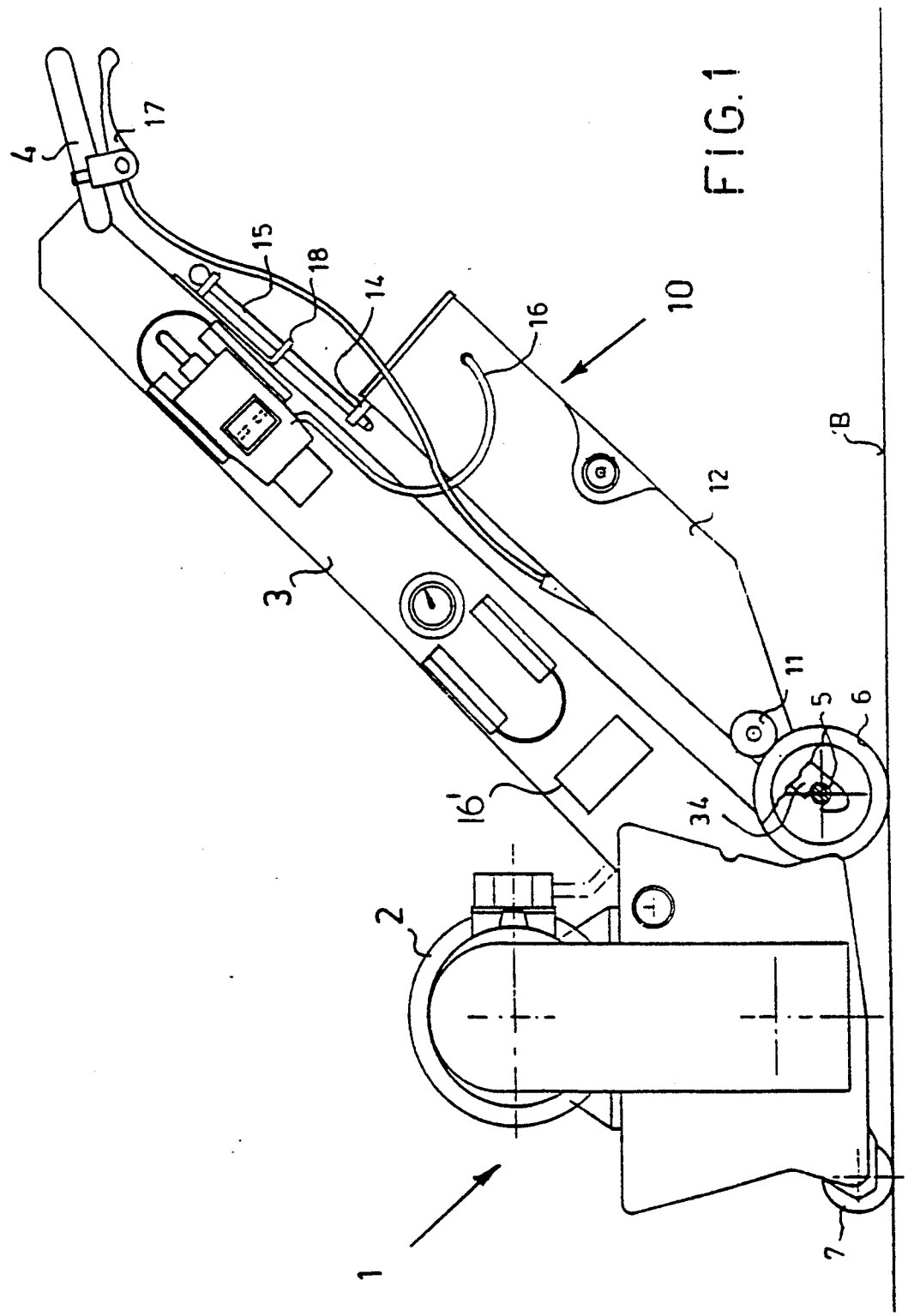
FIG. 1 shows an overall side view of a surface-cleaning machine with a feed device attached.

FIG. 1 shows a side view of a surface-cleaning machine 1 provided by the applicant. A drive motor 2 can be seen on the housing of the surface-cleaning machine 1 which drives a rotor drum inside the housing via a transmission. The surface-cleaning machine 1 is moved over the floor B to be cleaned by means of the handle supporting deck 3, which has a handle 4 on the upper end. In the area where the handle supporting deck 3 connects to the surface-cleaning machine 1, there is an axle 5, with two running wheels 6, one on each side of the deck 3. In the front, the surface-cleaning machine is supported by means of at least one roller 7.

A propulsion device, referred to herein as a feed device, is attached on the bottom to the handle supporting deck 3 and runs at an angle from bottom to top, as well as to the axle 5 of the surface-cleaning machine 1. The attachment of the feed device 10 to the axle 5 will be discussed later with reference to FIGS. 2 and 3. There is an eyelet 14 with a sliding bolt that goes through it on the device 10 to attach the feed device 10 to the deck 3. The sliding bolt 15 fits into a holder 18, which is on the top near the handle 4. The feed device 10 has a protective housing 12 around it that holds the drive, which drives at least one frictional wheel 11. When the feed device 10 is attached to the surface-cleaning machine 1, the frictional wheel 11 pushes on one of the two wheels on the side 6.

The drive motor in the housing 12 of the feed device 10 can be operated either on its own with a battery 21' that fits in the feed device or can be hooked up to the power supply 16' of the drive motor 2 of the surface-cleaning device 1. In the example shown, the latter variation is used. Thus, a connecting cable 16 can be seen between the feed device 10 and the handle supporting deck 3, which produces the electrical connection. The common power supply 16' for the drive motor 2 to activate the rotor drum in the surface-cleaning machine 1 and for the drive motor of the feed device 10 is shown in the drawing. A battery 21' should, of course, be used to power the motor 24 in the feed device 10 when the drive motor 2 for the rotor drum is an internal combustion engine. But the rotor drum of the surface-cleaning machine 1 could also be operated with a pneumatic motor 24 as a drive 2. In this case, the device would be connected to an air hose, 16 and the drive motor in the feed device 10 could in turn be connected to a power supply 16'.

The handle 4 of the handle supporting deck 3 has a control lever 17, by means of which the relative distance between the feed device 10 and the axle 5 of the cleaning machine 1 or the contact pressure with which the frictional wheel 11 makes contact with one of the wheels 6 on the cleaning machine 1 can be changed. How this works will be discussed later on.

Figure 2:
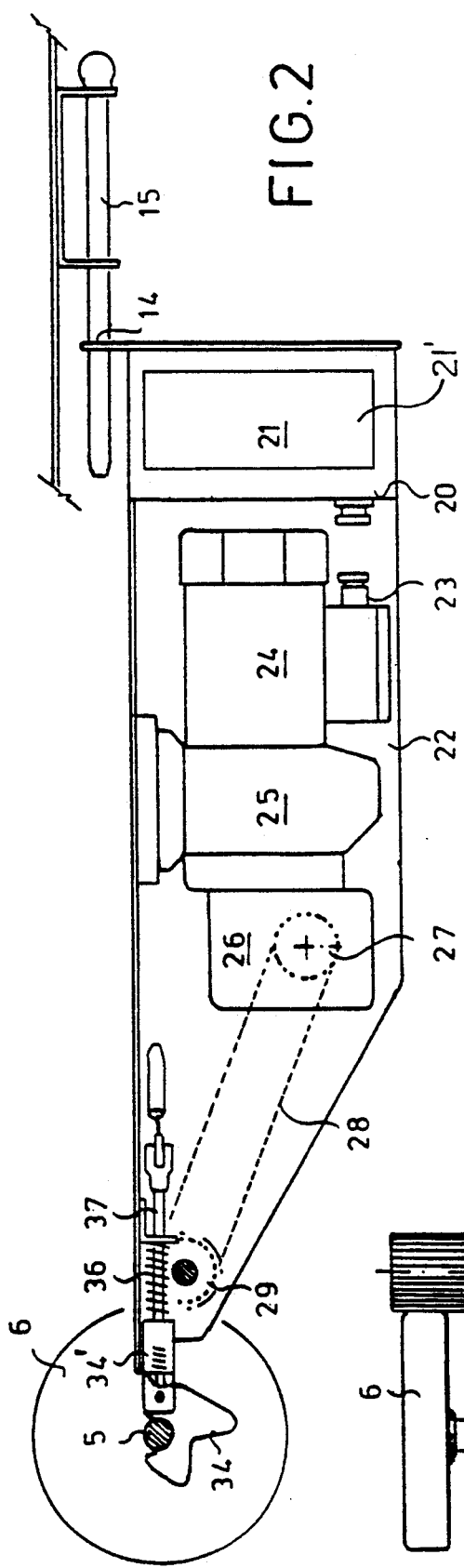
FIG. 2 shows a vertical section of the feed device attached to the surface-cleaning machine.

FIG. 2 shows schematically a simplified vertical longitudinal section through the feed device 10. This corresponds roughly to a side view of the feed device leaving out the near side wall of the surrounding housing 12. A vertical dividing wall 20 divides the housing into a battery chamber 21 and a drive chamber 22. If it is operating without a battery, the dividing wall 20 can be eliminated. A battery 21', also not shown here, is connected to the drive unit by means of electric clamps 23 and a connection not shown. The drive unit includes an electric motor 24, which drives a side gear 27 via a transducer 25 and a step-up gear 26. In an alternative embodiment, the drive unit includes a pneumatic motor 24. The side gear 27 is connected to a drive wheel 29 via a transmission medium 28. The drive wheel 29 sits tightly on a shaft 30 that has one frictional wheel 11 mounted securely on each side. The frictional wheels 11 act, as described previously, on the running wheels 6 of the surface-cleaning machine 1.

Figure 3:
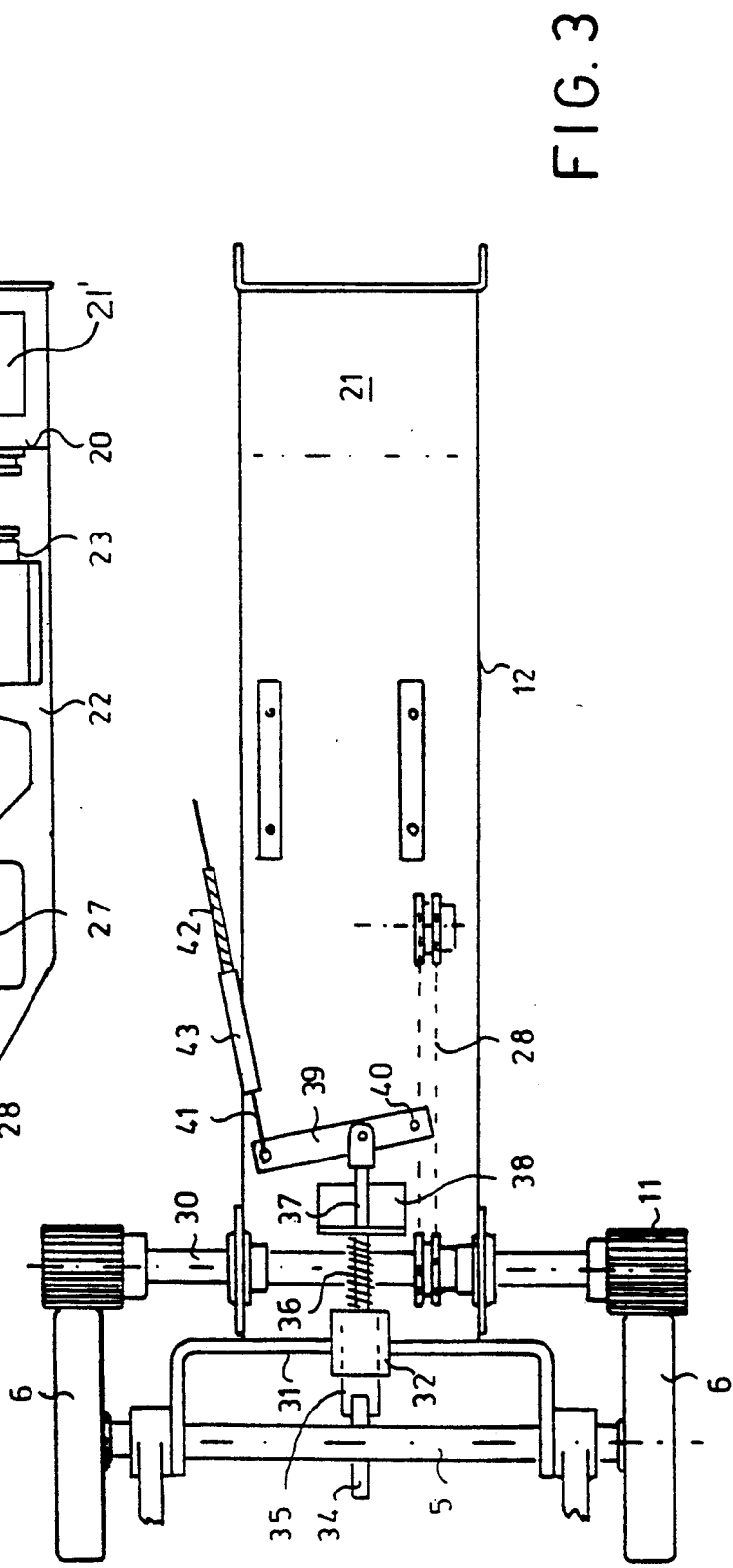
FIG. 3 shows a horizontal section leaving out the drive parts.

While the mechanical coupling 13 of the feed device 10 to the handle supporting deck 3 is easily accessible and so also easy to carry out, the connection of the feed device 10 to the axle 5 of the surface-cleaning machine 1 is relatively complex. With reference to FIG. 3, the whole feed device 10 is supported on the axle 5 by means of a two-pronged fork 31. When the two-pronged fork is attached to the axle 5, a swivel hook 34 placed midway between the two prongs of the fork 31 is swiveled away. When the two-pronged fork 31 is pushed down far enough on the axle 5, the hook 34 swivels back and surrounds the axle 5. The hook 34 is arranged so it can swivel on a tension rod 35, which goes through the fork 31 into a bushing 32. A pressure pin 34' mounted laterally in the tension rod 35 is spring-mounted and presses on the swivel hook 34, so that it surrounds the axle 5 as soon as the two-pronged fork 31 is pressed down into the catch position. A short tie rod 37 extends out of it on the end of the tension rod 35 opposite the hook. This tie rod passes through a bearing block 38 attached to the housing and is connected on its end to a one-armed swiveling lever 39. This one-arm swiveling lever 39 in turn has its fixed bearing point 40 on the housing 12. On its outer swiveling end, a wire cable 41 acts on a Bowden cable 42. The wire cable passes out of the housing through a bushing 43 and in the same bushing the sheath of the Bowden cable is supported directly or indirectly in the known way. In the second case, this is done by inserting a known set screw by means of which the Bowden cable can be adjusted. The Bowden cable 42 itself leads to a control lever 17, which corresponds to a regular bicycle brake lever and is placed on the handle 4 of the handle supporting deck 3. The control lever 17 can be attached to the handle 4 with a buckle closing, so that this part can also be released or attached quickly if the feed device is assembled or removed quickly.

All that need now be done to mount the feed device 10 is to push the two-pronged fork 31 onto the axle 5 until the hook 34 catches. The two prongs of the fork 31 each have corresponding jaws. After that, the only thing left to do is to insert the sliding bolt 15 into the eyelet 14 to fasten the feed device 10 to the handle supporting deck 3. The control lever 17 can be made to exert a tensile force on the hook 34 via the Bowden cable 42, whereby the whole feed device is pushed onto the axle 5 relative to the handle supporting deck, and the frictional wheels 11 press on the running wheels 6. But as soon as the control lever 17 is released, the hook 34 is pushed off on the axle 5. This activates a pressure spring 36 that surrounds the tie rod 37 and is arranged between the bearing block and the tension rod.

The feed device described 10 consequently has the advantage that it can be coupled simply and quickly to the surface-cleaning machines already available on the market without affecting their maneuverability. Also, the total weight of the surface-cleaning machine with the feed device increases only slightly so that its ability to be transported is not affected. By means of a circuit not shown in the drawing, the rotational direction of the drive motor of the feed device can be changed or stopped, regardless of the action of the drive motor on the surface-cleaning machine.

I claim:

1. A propulsion device (10) for a motor-driven surface-cleaning machine (1), said motor-driven surface-cleaning machine equipped for manual propulsion and having a handle-supporting deck (3) and an axle (5) extending laterally through a lower portion of said surface-cleaning machine, said axle having two running wheels (6), the propulsion device (10) comprising:
a detachable coupling between the surface-cleaning machine and the propulsion device;
a housing, said housing having at least one driven frictional wheel (11) positioned on said housing to drive at least one of the two running wheels (6) of the surface-cleaning machine when the propulsion device is coupled to the surface-cleaning machine.

2. The device according to claim 1, wherein the at least one frictional wheel (11) is driven by an electric motor (24) disposed in the housing of the propulsion device (10).

3. The device according to claim 2, wherein the electric motor (24) disposed in housing of the propulsion device is powered by a battery disposed in the housing of the propulsion device.

4. The device according to claim 2, wherein the surface-cleaning machine (1) is driven electrically, the electric motor (24) of the propulsion device is electrically connected to an electrical power supply disposed in the surface-cleaning machine.

5. The device according to claim 1, wherein the surface-cleaning machine (1) is driven pneumatically, the at least one frictional wheel of the propulsion device (10) is driven by a pneumatic motor, and the pneumatic motor of the propulsion device is connected to a pneumatic power supply disposed in the surface-cleaning machine (1).

6. The device according to claim 1, wherein the propulsion device (10) further comprises a two-pronged fork (31), said two-pronged fork disposed on the axle (5) of the surface-cleaning machine (1), and an eyelet disposed on an upper end of the propulsion device (10) for slidably engaging a sliding bolt (15) disposed on the handle-supporting deck (3) of the surface-cleaning machine.

7. The device according to claim 6, wherein the two-pronged fork has a bushing (32) mounted thereon, the bushing having a tension rod (35) disposed therein, the tension rod having a swivel hook (34) on a front end of the tension rod for grasping the axle (5) of the surface-cleaning machine.

8. The device according to claim 7, wherein the tension rod (35) further passes through a bearing block (38) attached to the housing (12), the tension rod having an upper end rotatably attached to a one-armed pivoting lever (39) also attached to the housing and interacting with a control level (17) on a handle (4) of the deck (3) via a cable (42).

9. The device according to claim 8, wherein a pressure spring (36) is disposed between the swivel hook

(34) and the housing (12) of the propulsion device (10) to impart a tendency to increase a relative distance between the propulsion device and the axle of the surface-cleaning machine.

10. The device according to claim 8, wherein the pressure spring (36) is disposed between the bearing block (38) and the tension rod (35).

11. The device according to claim 1, wherein the at least one frictional wheel (11) is attached to a shaft (30), said shaft mounted on bearings disposed in the propulsion device, the shaft driven by a transmission medium (28).

12. The device according to claim 9, wherein the pressure spring (36) is disposed between the bearing block (38) and the tension rod (35).

* * * * *

UNITED STATES PATENT AND TRADEMARK OFFICE
CERTIFICATE OF CORRECTION

PATENT NO. : 5,305,842
DATED : April 26, 1994
INVENTOR(S) : Paul Dummermuth

It is certified that error appears in the above-indentified patent and that said Letters Patent is hereby corrected as shown below:

Column 4, line 65, "level (17)" should read --lever (17)--.

Signed and Sealed this

Twenty-fifth Day of October, 1994

Attest:

BRUCE LEHMAN

*Attesting Officer*   *Commissioner of Patents and Trademarks*